Jan. 26, 1943.  C. H. YOUNG  2,309,490
ELECTRIC MEASURING APPARATUS
Filed Feb. 27, 1941

INVENTOR
C. H. YOUNG
BY
G. H. Heydt
ATTORNEY

Patented Jan. 26, 1943

2,309,490

UNITED STATES PATENT OFFICE 2,309,490

ELECTRIC MEASURING APPARATUS

Clarence H. Young, Lincoln Park, N. J., assignor to Bell Telephone Laboratories, Incorporated, New York, N. Y., a corporation of New York Application February 27, 1941, Serial No. 380,772

5 Claims. (Cl. 175—183)

This invention relates to alternating current electric bridges and more particularly to an admittance standard therefor.

It is known that in all types of electric bridges, greatest sensitivity and accuracy is obtained when the residual admittances or impedances in the measuring branches are maintained smaller than the admittance or impedance to be measured. It is also well known that the reference standard employed should be capable of calibration and adjustment in amounts much smaller than those to be measured.

In a copending application Serial No. 380,771 filed by C. H. Young on even date herewith, there is described a conductance standard characterized by the fact that the standard comprises a three-branch star-connected network which is relatively large compared with the unknown to be measured, yet introduces but very small effective residuals in the bridge arms and has effective magnitudes comparable to the unknowns being measured.

This invention is a further improvement upon the standard described in the above-mentioned copending application and has for its object the provision of an admittance standard which may be independently adjustable as to capacitance and conductance components but which is responsive to a single multiplying factor control.

It is a further object of the invention to provide an admittance standard which introduces effective residual admittances in the measuring branches smaller than the admittance to be measured.

A still further object of the invention is to provide an admittance standard capable of calibration and adjustment in amounts much smaller than the conductance and capacitance components to be measured.

The foregoing objects are attained by providing an admittance standard comprising a star-connected capacitance network connected to three terminals of a four-terminal alternating current bridge and a superimposed star-connected conductance network connected to two of the bridge terminals and the common junction of the capacitance star, the connection being so made as to subject both star-connected networks to the same multiplying factor control.

Figure 1:
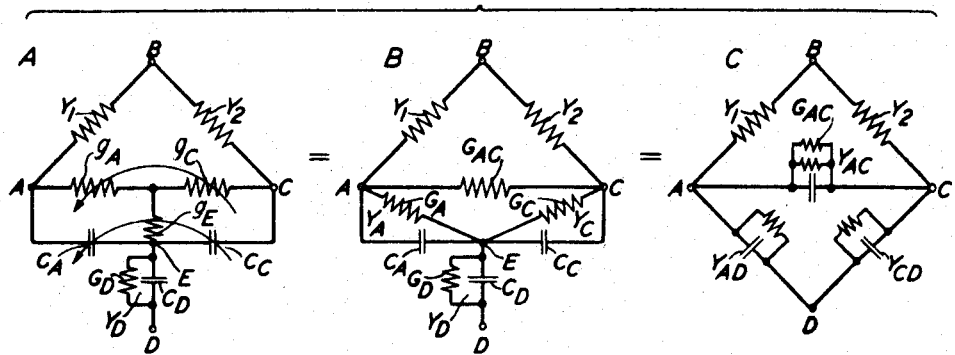
Figure 2:
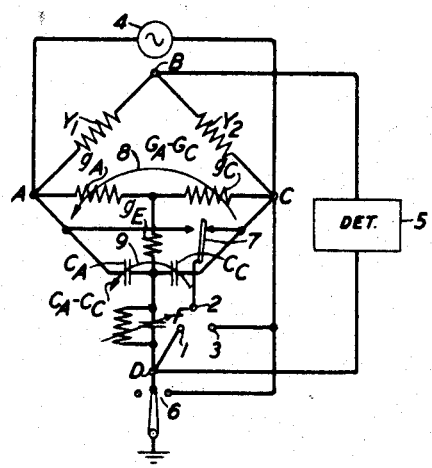
Figure 3:
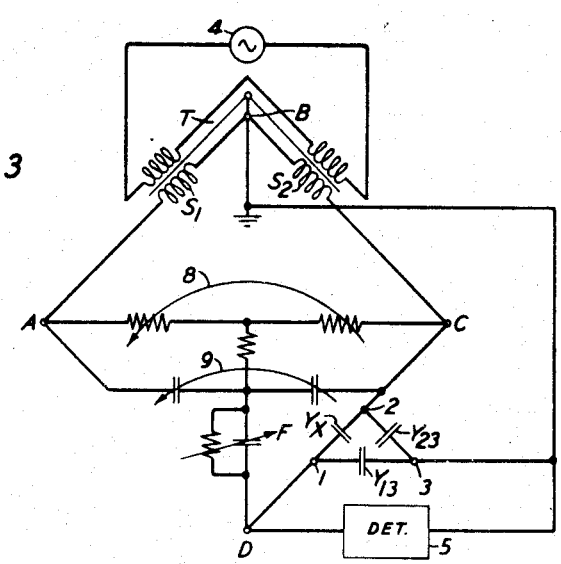

The invention may be better understood by referring to the accompanying drawing in which:

Fig. 1A discloses the elements of a four-terminal bridge embodying this invention;

Figs. 1B and 1C are equivalent transformations of the circuit of Fig. 1A for analytical purposes;

Fig. 2 discloses the invention applied to one type of alternating current bridge; and Fig. 3 discloses the invention applied to a different type of alternating current bridge.

Referring now more particularly to Fig. 1A, wherein is disclosed an ordinary four-terminal alternating current bridge comprising terminals A, B, C and D, respectively. Arms AB and BC are usually termed the ratio arms and may consist of any convenient form of admittance. To simplify the description of this invention, it will be assumed that the ratio arms for all of the figures have a unity ratio, although as is well known other ratios may be employed. The unknown complex admittance to be measured may be inserted in either the AD or the CD arm. Assuming, for example, that the unknown is inserted in the CD arm, the bridge will be balanced when an equivalent complex admittance is effectively inserted in the AD arm.

If a standard direct admittance were to be connected directly into the AD arm, the problem of making a suitable standard small enough to measure small interelectrode vacuum tube admittances becomes very difficult of practical achievement. Such a standard admittance would inherently introduce large residual admittances into the bridge arms and would also be difficult to make with precision.

This difficulty is overcome by the apparatus disclosed in Fig. 1A wherein the admittance standard is shown as a star-connected capacitance network having superimposed thereupon a star-connected conductance network. The capacitance star comprises three branches including capacitors $C_A$, $C_C$ and $C_D$, respectively connected together at the common junction E. The extremities of this star are connected to the A, C and D corners of the bridge, respectively. Capacitors $C_A$ and $C_C$ are adapted for differential adjustment, that is to say, as capacitance is added to or subtracted from capacitor $C_C$, a corresponding amount of capacitance is subtracted from or added to capacitor $C_A$.

The star-connected conductance network comprises conductances $g_A$, $g_C$ and $g_E$, respectively. Two of the conductances, $g_A$ and $g_C$, are adapted for differential adjustment, that is, as a given amount of conductance is removed from one an equivalent amount of conductance is added to the other. These two conductances are connected to the A and C corners of the bridge, respectively. The third conductance $g_E$ is connected to the common junction E of the capacitance star.

A further requirement for differential conductances $g_A$ and $g_C$ and differential capacitors $C_A$ and $C_C$ is that their sums must also be constant, that is to say, the sum of $g_A$ and $g_C$ must be constant and the sum of $C_A$ and $C_C$ must be constant.

Capacitance $C_D$ has connected in parallel therewith a conductance $G_D$ to comprise the complex admittance $Y_D$. The purpose of conductance $G_D$ will be described more in detail in connection with Figs. 1B and 1C.

The operation of the standard network just described may be better understood by transforming this network into the equivalent form shown in Figs. 1B and 1C. In Fig. 1B the capacitance star has remained unchanged, but the conductance star has been transferred into an equivalent delta network comprising conductances $G_A$, $G_C$ and $G_{AC}$. The method by which such analytical transformations are made is well known in the art and needs no description. The value of $G_A$ is given in the following expression in terms of the actual conductances in the original star network:

$$G_A = \frac{g_A g_C}{(g_A + g_C) + g_E} \quad (1)$$

Likewise the value of conductance $G_C$ is given by the following expression:

$$G_C = \frac{g_C g_E}{(g_A + g_C) + g_E} \quad (2)$$

The value of conductance $G_{AC}$ need not be given since it is effectively across a diagonal of the bridge and hence does not enter into the balance equation. It should now be noted that the A, C and D corners of the bridge shown in Fig. 1B have connected therein a star-connected admittance network comprising admittances $Y_A$, $Y_C$ and $Y_D$. $Y_A$ comprises parallel-connected conductance $G_A$ and capacitance $C_A$. Likewise, admittances $Y_C$ and $Y_D$ are made up of their components $G_C$, $C_C$ and $G_D$, $C_D$, respectively.

This star-connected admittance network may be further transformed into an equivalent delta-connected admittance network as shown in Fig. 1C comprising admittances $Y_{AD}$, $Y_{AC}$ and $Y_{CD}$. The admittance $Y_{AC}$ comprises the complex admittance just transformed from the star-connected admittance network of Fig. 1B plus the conductance $G_{AC}$ also shown in Fig. 1B. Since this entire complex admittance is across a bridge diagonal, it does not enter into the balance relation and may be disregarded in so far as the balance equation is concerned. Admittances $Y_{AD}$ and $Y_{CD}$, however, are important and may be expressed mathematically as follows:

$$Y_{AD} = \frac{Y_A Y_D}{(Y_A + Y_C) + Y_D} \quad (3)$$

$$Y_{CD} = \frac{Y_C Y_D}{(Y_A + Y_C) + Y_D} \quad (4)$$

Now if it is assumed that the unknown complex admittance $Y_U$ is connected between the C and D corners of the bridge, the bridge will be balanced by making the complex admittance $Y_{AD}$ greater than the complex admittance $Y_{CD}$ by an amount equal to the unknown complex admittance $Y_U$. This may be expressed mathematically as follows:

$$Y_U = Y_{AD} - Y_{CD} = \left[\frac{Y_D}{(Y_A + Y_C) + Y_D}\right][Y_A - Y_C] \quad (5)$$

In expression (5), the sum of complex admittances $Y_A$ and $Y_C$ may be shown to be constant and the real and imaginary components thereof may be separated as shown in the following complex expression:

$$(Y_A + Y_C) = (G_A + G_C) + j\omega(C_A + C_C) \quad (6)$$

The real components may be evaluated by adding their equivalents as expressed in Equations 1 and 2 above and this may be shown to be:

$$(G_A + G_C) = \frac{g_E(g_A + g_C)}{g_A + g_C + g_E} \quad (7)$$

As previously stated the sum of the differential conductances $g_A$ and $g_C$ is kept constant. Since $g_E$ is also a constant, it follows from Equation 7 that the sum $G_A + G_C$ is a constant. It was also previously stated that the differential capacitors $C_A$ and $C_C$ are so designed as to maintain the sum of their capacitances constant. Therefore, the imaginary component from Equation 6 above is also constant. Since both the real and imaginary components are kept constant, it follows that the complex admittance sum $Y_A + Y_C$ of Equation 6 is a constant. This shows that the quantity in the first bracket of Equation 5 can be made a multiplying factor of any desired magnitude between the limits of zero and unity, depending solely upon the magnitude of admittance $Y_D$.

Equation (6) shows that the constant sum of admittances $Y_A$ and $Y_C$ has a constant phase angle. Now if complex admittance $Y_D$ is adjusted to have exactly the same phase angle, it can be seen that the factor in the first bracket of Equation 5 will be a pure number $F$. This may be expressed mathematically as follows:

$$F = \frac{Y_D}{(Y_A + Y_C) + Y_D} \quad (8)$$

Equation 5 may be, therefore, rewritten in simpler form as follows:

$$Y_U = F(Y_A - Y_C) \quad (9)$$

Complex admittance $Y_D$ may be adjusted to the desired phase angle by suitably adjusting the magnitude of shunting conductance $G_D$ shown in Figs. 1A and 1B. To maintain factor $F$ a pure number, the phase angle of admittance $Y_D$ is kept constant in a manner well known to the art. In actual practice the factor $F$ is preferably made a series of decimal decade numbers such as 1, 0.1, 0.01, etc. Since they are in discrete steps, it is very easy to adjust their shunting conductance $G_D$ to maintain the required constant phase angle.

The real and imaginary components of the complex admittances in Equation 9 may be expressed as follows:

$$Y_U = G_U + j\omega C_U = F[(G_A - G_C) + j\omega(C_A - C_C)] \quad (10)$$

where:

$$G_U = F(G_A - G_C) = F \cdot \frac{g_E(g_A - g_C)}{(g_A + g_C) + g_E}$$
$$= F \cdot K(g_A - g_C)$$
$$C_U = F(C_A - C_C)$$

Equation 10 shows that the quantity $(G_A - G_C)$ is equal to a constant, $K$, times the quantity ($g_A - g_C$). This enables the differential conductance standard to be calibrated directly in terms of ($G_A - G_C$). The conductance component $G_U$ can, therefore, be obtained directly from the bridge by multiplying the factor F by the reading of the conductance standard. Also the capacitance component may be read directly from the bridge in a similar manner, remembering that the capacitance standard may be calibrated directly in capacitance units ($C_A - C_C$). It should also be noted that the same multiplying factor F is used in connection with the capacitance standard.

From the above description it will be seen that the bridge manipulations to obtain balance for any complex admittance within the range of the bridge are exceedingly simple and under the control of a minimum number of dials.

Fig. 2 discloses the invention applied to an admittance bridge adapted to measure balanced to ground, grounded or direct admittances. In this figure, as well as in Fig. 3, the shielding has been omitted for the sake of clarity. The admittance standard of this invention is connected between the A, C and D corners of the bridge as was shown in Fig. 1A. The unknown admittance, if it be balanced to ground or be a grounded admittance, is connected to test terminals 1, 2. It will be seen that this will connect the unknown admittance to the C and D corners of the bridge, the connection to the C corner being made through switch 7. Power is supplied from an alternating current source 4 to the A, C terminals of the bridge and a suitable detector 5 is connected to the B and D terminals. The ratio arms of the bridge may comprise admittances $Y_1$ and $Y_2$ which may or may not be equal. As previously stated, however, they are assumed equal for the purposes of explanation. Switch 6 is adapted to connect ground to either the C or D terminals or to remove the ground entirely from the bridge.

The differential conductance dial control is represented symbolically by a curved arrow 8. In a practical embodiment, this preferably takes the form of two or more dials, one for continuous adjustment over a small range and the others adapted for decade adjustments. The manner in which this is done need not be disclosed in detail here as it is well known in the art. Similarly, the differential capacitance control is represented symbolically by a curved arrow 9 and decade controls are also supplied in connection with the differential capacitors.

In making direct admittance measurements, it is customary to tie together all terminals except the two embracing the direct admittance to be measured, and if not already inherently grounded to ground them to the bridge ground. When using this bridge this is done by connecting the unknown direct admittance between terminals 1 and 2 and all the other terminals of the unknown to test terminal 3. Switch 6 is then operated to ground test terminal 3 and the C corner of the bridge. One balance measurement is made with the C corner connected to test terminal 2. Switch 7 is then operated to connect the A corner of the bridge to test terminal 2 and a second balance is obtained. As is well known the direct admittance is then measured by one-half the difference between the two balance readings. It will be at once appreciated, however, that where these direct admittances are very small, as for example, in vacuum tubes adapted for high frequency operation, that a standard capacitor connected directly in the AD arm of the bridge would necessarily have to be very small and would be correspondingly very difficult to make with precision. Moreover, such a standard capacitor (even where unequal ratio arms are employed) would introduce rather large residual admittances in the measuring arm. The admittance standard of this invention provides a convenient means of measuring these small admittances free of excessive residuals in the measuring arm. Moreover, the multiplying factor control for both the capacitance component and the conductance component is embodied in a single control, that is to say the multiplying factor F provided by adjustable admittance $Y_D$ applies to both of the components of the admittance standard. This has been done without sacrificing independent adjustment of the admittance components which greatly simplifies the use of such a bridge and extends its range of usefulness.

Fig. 3 discloses the invention applied to a bridge especially adapted for the measurement of direct admittances. This bridge is supplied with alternating current from source 4 through transformer T to the A, C corners of the bridge. Transformer T is specially wound so that secondaries $S_1$ and $S_2$ are exactly equal and nearly perfectly coupled. One method found satisfactory for obtaining a suitable degree of coupling is to use a toroidal core, the windings $S_1$ and $S_2$ consisting of a twisted pair with insulation thickness small compared to the wire diameter, winding $S_1$ being one wire of this pair and winding $S_2$ being the companion wire. With this type of construction the potentials induced from the primary into the secondaries $S_1$ and $S_2$ will be equal in magnitude and phase. Furthermore because of the high degree of coupling between secondaries $S_1$ and $S_2$, any capacitance of reasonable size shunting either of the secondaries will have a negligible effect upon this potential balance. The combined conductance and capacitance standard is here shown connected between the A, C and D corners of the bridge as in the previous figures and the reference characters also correspond with those shown in the previous figures. The B corner of the bridge is preferably grounded and a suitable detector 5 is connected between this ground and the D corner.

When the leads from the C and D corners are shielded, this type of bridge may be used to measure direct admittances with a single reading of the bridge whereas two readings were required for the bridge shown in Fig. 2. For this purpose three test terminals are provided, 1, 2 and 3. Test terminals 1 and 2 are connected to the D and C corners of the bridge, respectively and are actually included in a grounded shield while test terminal 3 is connected to ground (B corner). The direct admittance $Y_x$ to be measured is connected between terminals 1 and 2 and the stray admittances are all tied to the terminal 3 and may be represented by admittances $Y_{23}$ and $Y_{13}$. With such a connection it will be noted that the stray admittance $Y_{13}$ is connected across diagonal terminals B, D and therefore is not included in the balance equation for the bridge. The direct admittance is connected as it should be between the C and D corners of the bridge and stray admittance $Y_{23}$ is connected across the B and C corners of the bridge. This latter stray admittance has no perceptible effect upon the balance condition of the bridge since it is connected across transformer secondary $S_2$ which is nearly perfectly coupled with secondary $S_1$. The degree of coupling obtained in practice for a bridge adapted to measure vacuum tube direct capacitances has been found so nearly perfect that disturbance in balance is scarcely perceptible even for stray capacitance values as large as 200 micro-microfarads. It follows, therefore, that the direct admittance $Y_x$ is balanced by the direct standard admittance provided by the combined conductance and capacitance standard and is practically independent of all stray admittances.

While the invention has been herein specifically described in connection with two particular forms of alternating current bridges, it is obvious to those skilled in the art that the invention may be applied to many other forms of alternating current bridges.

What is claimed is:

1. In an alternating current electric bridge having four terminals, an admittance standard therefor comprising in combination a three branch star-connected differential capacitance network having a common junction point, two branches whereof are adapted for differential adjustment, means connecting the differentially adjustable branches to two opposite bridge terminals and the third branch to a third bridge terminal, a three branch star-connected differential conductance network, two of said conductance branches adapted for differential adjustment, means connecting the differentially adjustable conductance branches to the same opposite bridge terminals as said differential capacitance branches and the third conductance branch to the said common junction point.

2. In an alternating current electric bridge having four terminals, an admittance standard therefor comprising in combination a three branch star-connected differential capacitance network having a common junction point, two branches whereof are adapted for differential adjustment and the third branch adapted for independent adjustment, means connecting the differentially adjustable branches to two opposite bridge terminals and the third branch to a third bridge terminal, a three branch star-connected differential conductance network, two of said conductance branches adapted for differential adjustment, means connecting the differentially adjustable conductance branches to the same opposite bridge terminals as said differential capacitance branches and the third conductance branch to the said common junction point, whereby the third capacitance branch provides multiplying factors common to both the conductance and capacitance components.

3. In an alternating current electric bridge having four terminals, an admittance standard therefor comprising in combination a three branch star-connected differential capacitance network having a common junction point, two branches whereof are adapted for differential adjustment and the third branch adapted for independent adjustment in discrete steps to provide a series of decimal decade multiplying factors, means connecting the differentially adjustable branches to two opposite bridge terminals and the third branch to a third bridge terminal, a three branch star-connected differential conductance network, two of said conductance branches adapted for differential adjustment, means connecting the differentially adjustable conductance branches to the same opposite bridge terminals as said differential capacitance branches and the third conductance branch to the said common junction point, whereby the third capacitance branch provides multiplying factors common to both the conductance and capacitance components.

4. In an alternating current electric bridge having four terminals, an admittance standard therefor comprising in combination a three branch star-connected differential capacitance network having a common junction point, two branches whereof are adapted for differential adjustment and the third branch including a constant phase angle capacitor adapted for independent adjustment in discrete steps to provide a series of decimal decade multiplying factors, means connecting the differentially adjustable branches to two opposite bridge terminals and the third branch to a third bridge terminal, a three branch star-connected differential conductance network, two of said conductance branches adapted for differential adjustment, means connecting the differentially adjustable conductance branches to the same opposite bridge terminals as said differential capacitance branches and the third conductance branch to the said common junction point, whereby the third capacitance branch provides multiplying factors common to both the conductance and capacitance components.

5. In an alternating current electric bridge having four terminals, an admittance standard therefor comprising a three branch star-connected capacitance network connected to three terminals of said bridge, a common junction therefor, a similar three branch star-connected conductance network, and means connecting two of said conductance branches to the opposite bridge terminals to which two capacitance branches are connected and the third conductance branch to said common junction.

CLARENCE H. YOUNG.